United States Patent
Hühnlein et al.

(10) Patent No.: US 11,155,962 B2
(45) Date of Patent: Oct. 26, 2021

(54) STEAM SAVING DEVICE

(71) Applicant: Clariant International Ltd., Muttenz (CH)

(72) Inventors: Björn Hühnlein, Straubing (DE); Thomas Hoppe, Landshut (DE); Ralf Hortsch, Munich (DE); Konstanze Graser, Munich (DE)

(73) Assignee: Clariant International, Ltd., Muttenz (CH)

( * ) Notice: Subject to any disclaimer, the term of this patent is extended or adjusted under 35 U.S.C. 154(b) by 105 days.

(21) Appl. No.: 15/780,201

(22) PCT Filed: Nov. 30, 2016

(86) PCT No.: PCT/EP2016/079272
§ 371 (c)(1),
(2) Date: May 30, 2018

(87) PCT Pub. No.: WO2017/102330
PCT Pub. Date: Jun. 22, 2017

(65) Prior Publication Data
US 2020/0011011 A1      Jan. 9, 2020

(30) Foreign Application Priority Data

Dec. 14, 2015 (EP) ..................... 15199879

(51) Int. Cl.
*D21C 1/02* (2006.01)
*B01J 4/00* (2006.01)
*D21B 1/36* (2006.01)

(52) U.S. Cl.
CPC .............. *D21C 1/02* (2013.01); *B01J 4/002* (2013.01); *D21B 1/36* (2013.01); *B01J 2204/002* (2013.01); *B01J 2204/005* (2013.01)

(58) Field of Classification Search
CPC ... D21C 1/02; D21C 7/08; B01J 4/002; B05B 7/0075; D21B 1/36; F01D 17/16
See application file for complete search history.

(56) References Cited

U.S. PATENT DOCUMENTS

| | | | |
|---|---|---|---|
| 2,017,043 A | 10/1935 | Galliot | |
| 2002/0043221 A1* | 4/2002 | Hytonen | F23G 7/04 122/428 |

(Continued)

FOREIGN PATENT DOCUMENTS

| | | |
|---|---|---|
| CN | 101348804 A | 1/2009 |
| CN | 103321073 A | 9/2013 |

(Continued)

OTHER PUBLICATIONS

Stanford Advanced Materials, Alumina, 2014, Stanford Advanced Materials (Year: 2014).*

*Primary Examiner* — Eric Hug
*Assistant Examiner* — Elisa H Vera
(74) *Attorney, Agent, or Firm* — Verrill Dana, LLP

(57) ABSTRACT

The steam saving device for a steam explosion system for the hydrothermal pre-treatment of biomass comprises a tubular body 30 with a first open end 32 and a second open end 34. The first open end 32 being adapted to be coupled to an outlet opening 14 of a steam explosion reactor vessel 10, the second open end 34 being adapted to be coupled to a discharge line 18. The inner surface 36 of the tubular body 30 of the nozzle 16 may comprise an engraved helical structure 38.

9 Claims, 3 Drawing Sheets

(56) References Cited

U.S. PATENT DOCUMENTS

| | | | |
|---|---|---|---|
| 2005/0183542 A1 | 8/2005 | Uesaka et al. | |
| 2005/0258281 A1 | 11/2005 | Schwegler et al. | |
| 2009/0010825 A1* | 1/2009 | Polti | A61L 2/07 |
| | | | 422/298 |
| 2012/0211512 A1 | 8/2012 | Pschorn et al. | |
| 2014/0110069 A1* | 4/2014 | Rawls | D21B 1/36 |
| | | | 162/21 |
| 2015/0233053 A1* | 8/2015 | Stromberg | D21C 7/08 |
| | | | 162/21 |
| 2016/0059248 A1* | 3/2016 | Yamauchi | B05B 5/0415 |
| | | | 239/296 |
| 2016/0158722 A1* | 6/2016 | Knapper | F23G 7/05 |
| | | | 422/140 |

FOREIGN PATENT DOCUMENTS

| | | |
|---|---|---|
| CN | 203291824 U | 11/2013 |
| CN | 204356320 U | 5/2015 |
| EP | 2389445 A1 | 11/2011 |
| EP | 2389480 A1 | 11/2011 |
| WO | 2007108021 A1 | 9/2007 |

* cited by examiner

STEAM SAVING DEVICE

The present invention relates to a steam saving device.

Conventional steam explosion systems typically comprise a reactor vessel, having inlets and outlets, a piping system and a separation device for separating steam and other gasses from the pre-treated biomass. The reactor vessel comprises inlets for loading biomass and steam. The biomass/steam mixture is pressurized in the reactor vessel for a predefined time period. The steam-infused biomass material is then rapidly depressurized and conveyed via a piping system to the separation device. The so obtained biomass is than subjected to further processing steps.

A steam explosion system with the above elements is for example known from EP 2389480 and EP 2389445.

The present invention solves the problem of reducing the steam consumption in hydrothermal pre-treatment of biomass.

This problem is solved by the provision of a steam saving device or nozzle in accordance with claim 1.

The nozzle comprises a tubular body with a first open end and a second open end. The nozzle is adapted to be inserted into and coupled to an outlet opening of a steam explosion reactor, wherein the second open end is coupled to a conduit for conveying the pretreated biomass to at least one second device, preferably comprising a separator and the first open end is lining up with the inner wall of the reactor vessel or protruding into the reactor vessel. The inner surface of the tubular body of the nozzle comprises an engraved helical structure.

It was surprisingly found by the inventors, that the engraved helical structure of the nozzle reduces the steam consumption of the hydrothermal pre-treatment system considerably.

The dimensions of the nozzle depend on the process parameters and the biomass material to be treated. The dimensions of the nozzle therefore generally have to be adapted to the specific process conditions.

In a preferred embodiment the pitch of the engraved helical structure is in the range of from 1 to 300 mm, preferably from 10 to 150 mm, more preferably from 20 to 100 mm and most preferably from 30 to 60 mm. Particularly preferred are 30, 40, 50 and 60 mm.

The length of the nozzle is in the range of from 1 to 3500 mm, preferably from 10 to 1000 mm, and more preferably from 30 to 600 mm, further preferred from 60 to 500 mm. Most preferred are lengths of 50, 60, 80, 100, 200, 300, 400 and 500 mm. The length and the pitch of the engraved helical structure may suitable be chosen such that about 1 to 5 full convolutions and preferably 2 full convolutions are obtained.

The cross-sectional area of the inner surface of the nozzle is in the range of from 10 to 9000 $mm^2$, preferably from 20 to 8000 $mm^2$, more preferably from 50 to 700 $mm^2$, also preferred of from 60 to 5000 $mm^2$. Further preferred ranges are from 10 to 150 $mm^2$, from 30 to 100 $mm^2$ and from 50 to 80 $mm^2$ as well as ranges of from 1000 $mm^2$ to 8000 $mm^2$, from 1500 to 7000 $mm^2$ and from 2000 to 6000 $mm^2$. The smaller the cross-sectional area of the inner surface of the nozzle, the smaller is the overall steam consumption.

The nozzle may have any suitable shape. However, preferably the cross-sectional shape of the inner surface of the nozzle is circular or ellipsoid, such that turbulences of the biomass material flow are reduced.

The depth of the engraved helical structure is in the range of from 0.1 to 15 mm, preferably of from 0.5 to 10 mm, and more preferably of from 1 to 5 mm, whereas of from 1.5 to 3 mm is also preferred.

The width of the engraved helical structure is in the range of from 0.1 to 3 mm, preferably of from 0.5 to 2 mm, and more preferably of from 1.0 to 1.5 mm.

The nozzle may generally be made from any material known to a person skilled in the art as suitable for the inventive purpose. The nozzles are preferably made from material of high abrasion resistance such as ceramic material, such as aluminium oxide, and more preferably from high purity aluminium oxide material, and most preferably from aluminium oxide having a purity of above 92% and more preferably having a purity of 99.7%, particularly preferred a purity of from 99.50 to 99.99%. An abrasion resistance of Vickers hardness of at least 1800 MPa is preferred. Particularly preferred is an abrasion resistance of at least 2000 MPa Vickers hardness wherein at least 2500 MPa are most preferred.

In a further aspect the present invention is also directed to a system for steam explosion treatment of biomass material, comprising a pressurized reactor vessel, with at least one outlet. A tubular nozzle as as defined within the application with an engraved helical structure at its inner wall surface is inserted into and coupled to the at least one outlet of the reactor vessel. Within a preferred embodiment, the system further comprises a conduit coupled to the nozzle for conveying the pretreated biomass to at least one second device, and at least one second device, preferably comprising a separator.

Any suitable separator may be used within the system of the present invention to separate the solids and steam. Within a preferred embodiment the system comprises a cyclone separator. It is also possible to use multiple cyclone separators for the separation of biomass and steam. Within a particularly preferred embodiment the system comprises means to separate pressurized steam from the solids. Pressurized steam may then be recycled into the reactor vessel and/or be utilized for other applications leading to an even further decrease of steam consumption. "Means to separate pressurized steam" according to the present applications may be realized as a combination of two devices wherein the first device functions as a mechanical separator for separating the pressurized steam from the pretreated material and a subsequent cyclone separator for further steam separation and to expand to atmospheric pressure. Within an alternative embodiment the separator may be a pressure cyclone separator.

The biomass material to be treated by the system may be lignocellulosic material. Lignocellulosic material includes, but is not limited to plant material such as wheat straw, barley straw, rice straw, wood, wood chips, sawmill and paper mill discards, corn stover, sugarcane bagasse, and other agricultural residues, dedicated energy crops, municipal paper waste, and any other biomass material comprising cellulose, hemicellulose and lignin. The biomass material preferably has a dry matter (DM) content of from 30 to 70 wt.-%, further preferred of from 40 to 60 wt.-% and also preferred of from 45 to 55 wt.-%.

Features described in relation to one aspect may equally be applied to other aspects of the invention.

The invention will be further described, by way of example only, with reference to the accompanying drawings in which.

Figure 1:
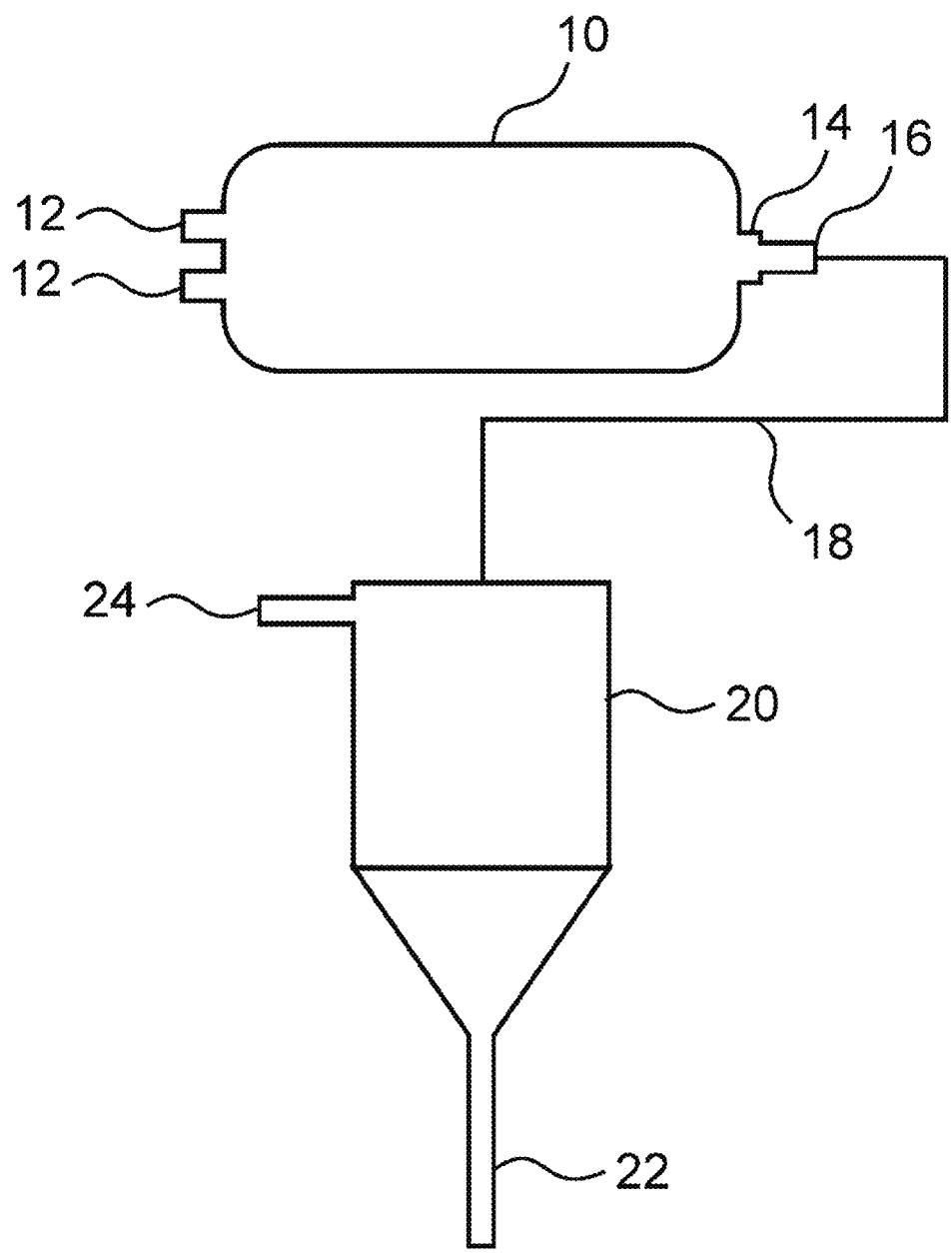
FIG. 1 shows a process flow diagram of a hydrothermal pretreatment process.

In FIG. 1 a process flow diagram is depicted which illustrates the main components of a hydrothermal pre-treatment system. The system comprises a reactor vessel 10 with inlets 12 and an outlet 14. A steam saving device/nozzle 16 is provided at the outlet 14 of the reactor vessel 10. The nozzle 16 is coupled to a conduit 18 which is connected to a separation device 20.

In a hydrothermal pre-treatment process, biomass and steam are conveyed to the reactor vessel 10 via inlets 12. The biomass material is pressurized with steam in the reactor vessel 10 at elevated temperatures for a predetermined amount of time. After the heat/pressure treatment the outlet valve 14 is opened and the hydrothermally pre-treated biomass is allowed to expand. The expansion process is also referred to as "steam explosion". By rapidly releasing the pressure, the steam expands within the biomass material and bursts the cells of the biomass material or defibrillates the biomass material. In the depicted embodiment in FIG. 1, the separation device is a cyclone 20 having a first outlet 22 for the pre-treated biomass and a second outlet 24 for steam and other gasses.

Figure 2:
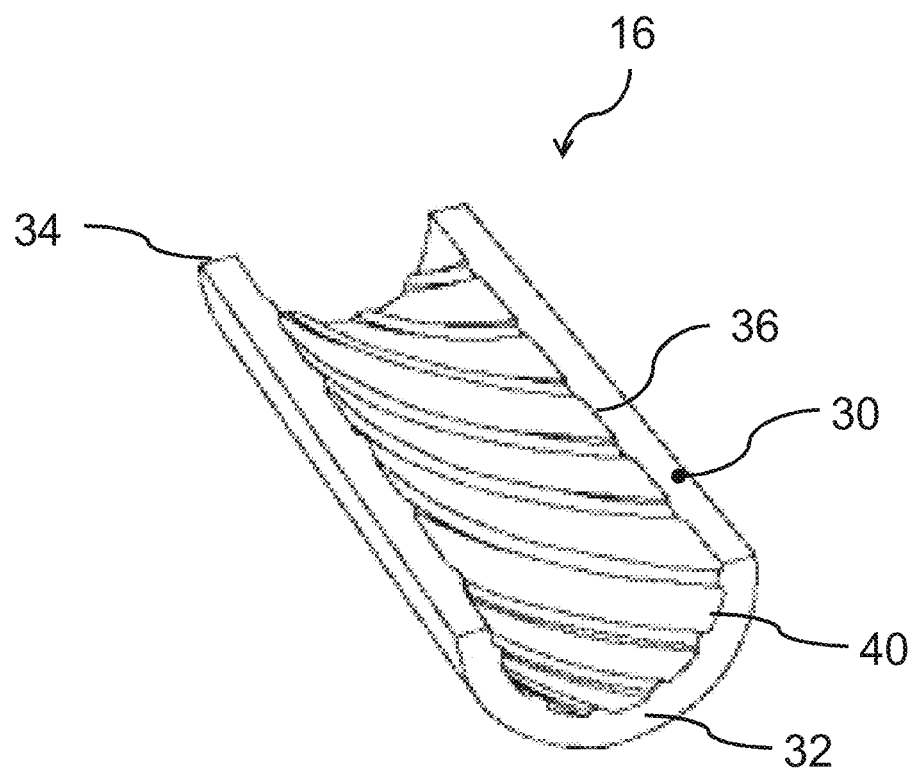
FIG. 2 shows a part of a cut-open nozzle of the present invention with helically engraved inner wall.

In a preferred embodiment of the invention, the steam saving device is a tubular nozzle 16 as depicted in FIG. 2. The nozzle 16 comprises a generally cylindrical tubular body 30 with a first open end 32 and a second open end 34. The tubular body 30 has generally circular cross-section. The inner wall surface 36 of the tubular body 30 is provided with an engraved helical structure. The depicted structures of FIG. 2 do not necessarily correspond to the actual dimensions of the nozzle 16. Only the lower half of a part of the nozzle 16 is depicted, such that the engraved helical structure at the inner wall surface 36 is visible. The helical structure consists of a plurality of grooves 40 having a depth of 1 mm and a width of 1.5 mm. The pitch of the grooves 40 amounts to 30 mm such that each groove 40 forms two convolutions along the full length of 60 mm of the nozzle 16.

The nozzle 16 depicted in FIG. 2 is made from commercially available high purity aluminium oxide material ($Al_2O_3$ 99.7%). With a nozzle 16 made from this material, no abrasion was detected after 200 h of operation. Thus, the nozzle 16 not only reduces the required amount of steam in the hydrothermal pre-treatment of biomass, but the ceramic nozzle 16 also allows for smoother operation, since the pre-treatment process had not to be interrupted for maintenance.

In the following, experimental results for steam consumption in a hydrothermal pre-treatment process according to the state of the art (without nozzle) and with a nozzle according to the invention are shown.

COMPARATIVE EXAMPLE

In this example the biomass material was wheat straw bales, which were loosened up in a bale crusher equipped with rotating scrappers operated at 3000 rpm yielding particles with particle sizes from 10 to 40 cm. This particle size ensures smooth transport of the straw and operation of the subsequent milling step. The biomass material was pneumatically transported to a hammer mill operated at 3000 rpm with 30 mm sieves where the straw was cut to pieces with particle sizes from 1 to 5 cm.

The cut straw was transported to the thermal pre-treatment system with a pin drum feeder followed by a transportation screw and plug screw. In the reactor vessel the wheat straw was continuously pre-treated in a reactor at 160° C. for 5 min without addition of any chemicals. After this hydrothermal pre-treatment, the biomass material was transported to a cyclone to separate the organic materials form the gases.

Figure 3:
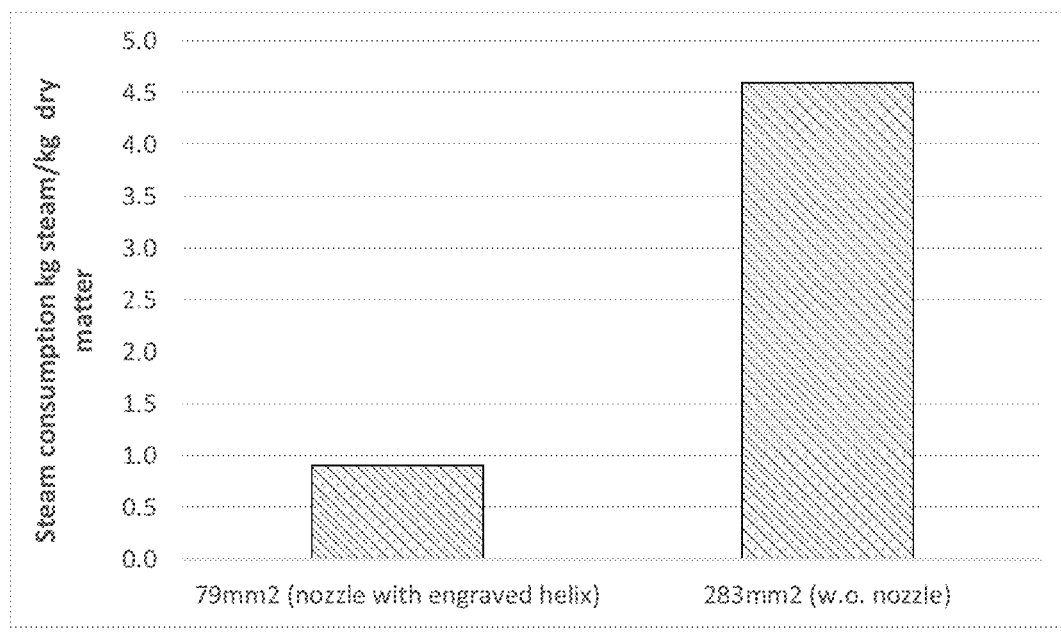
FIG. 3 shows a diagram illustrating the steam consumption of the system with and without using a nozzle at the outlet end of the reactor vessel.

The reactor vessel used in thermal pre-treatment had an outlet with a cross-sectional area of about 283 $mm^2$. The steam was measured to amount to 4.6 kg steam per 1 kg dry matter as depicted in FIG. 3.

Example 1

A nozzle with engraved helical structure according to the present invention was inserted into the outlet of the reactor vessel. The nozzle was made from aluminium oxide ceramic (99.7%), having a length of 60 mm and was provided with an engraved helical structure at the inner wall surface. The helical structure had a pitch of 30 mm. The two grooves of the helical structure had a depth of 1.0 mm and a width of 1.5 mm.

The further process parameter were identical to the process parameters of the comparative example.

In Table 1 and FIG. 3 the results of the steam consumption without nozzle and with a nozzle according to the present invention are indicated. With constant dry matter feed of 400 kg/h, the steam consumption amounted to 1840 kg/h without nozzle. This corresponds to a specific steam consumption of 4.6 kg steam per 1 kg dry matter.

In contrast thereto, using the nozzle according to the present invention, for the same amount of dry matter feed, the steam consumption was reduced to 364.7 kg/h. This corresponds to a specific steam consumption of only 0.91 kg steam per 1 kg dry matter, which represents an effective reduction of steam consumption by factor 5.

| Nozzle | Feed [kg (dry matter)/h] | Steam Flow (200F25) [kg/h] | Specific Steam Consumption [kg (steam)/kg (dry matter)] |
| --- | --- | --- | --- |
| No nozzle | 400 | 1840 | 4.60 |
| Nozzle with engraved helix | 400 | 364.7 | 0.91 |

As a final advantage, the resulting pressure in the conduit between the nozzle and the separator device was reduced when a nozzle according to the present invention was used. Reduced pressure beneficially affects the lifetime of the piping system.

The invention claimed is:

1. A nozzle (16) adapted to be coupled to and inserted into an outlet opening (14) of a steam explosion reactor vessel (10) of a steam explosion system for the hydrothermal pre-treatment of biomass, the nozzle (16) configured to transfer pre-treated biomass suspended in steam from said reactor vessel via a conduit (18) to a separation device, the nozzle (16) comprising:

a tubular body (30) with a first open end (32) and a second open end (34), the first open end (32) coupled to and inserted into the outlet opening (14) of the reactor vessel (10) to receive pre-treated biomass from the reactor vessel, the second open end (34) coupled to the conduit (18) to the separation device to convey the pretreated biomass to the separation device, wherein an inner wall surface (36) of the tubular body (30) of the nozzle (16) comprises an engraved helical structure, wherein the nozzle (16) is made from a ceramic material, and wherein the engraved helical structure of the nozzle is capable of reducing steam consumption in a steam explosion-based hydrothermal pre-treatment of a biomass carried out using said reactor vessel (10), nozzle (16), and conduit (18) by at least about 5-fold compared to the nozzle lacking an engraved helical structure.

2. The nozzle (16) according to claim 1, wherein the pitch of the engraved helical structure is in the range of between 1 and 300 mm.

3. The nozzle (16) according to claim 1, wherein the length of the nozzle (16) is in the range of from 1 to 3500 mm.

4. The nozzle (16) according to claim 1, wherein the cross-sectional area of the inner wall surface (36) of the nozzle (16) is in the range of from 10 to 9000 $mm^2$.

5. The nozzle (16) according to claim 1, wherein the depth of the engraved helical structure is in the range of from 0.1 to 15 mm.

6. The nozzle (16) according to claim 1, wherein the width of the engraved helical structure is in the range of from 0.1 to 3 mm.

7. The nozzle (16) according to claim 1, wherein the nozzle (16) is made from aluminium oxide having a purity of above 92%.

8. The nozzle (16) according to claim 1, wherein the nozzle (16) is made from aluminium oxide having a purity of 99.7%.

9. The nozzle (16) according to claim 1, wherein the nozzle (16) reduces pressure in said conduit (18).

* * * * *